Figure 1:
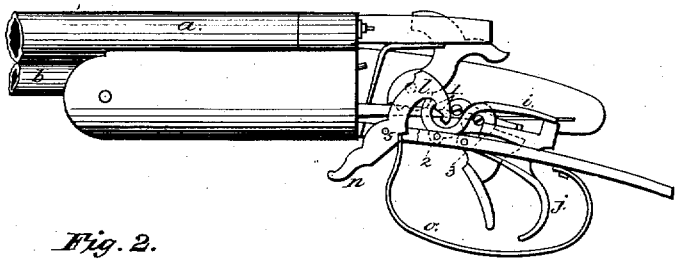
Figure 2:
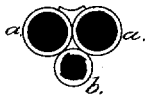
Figure 3:
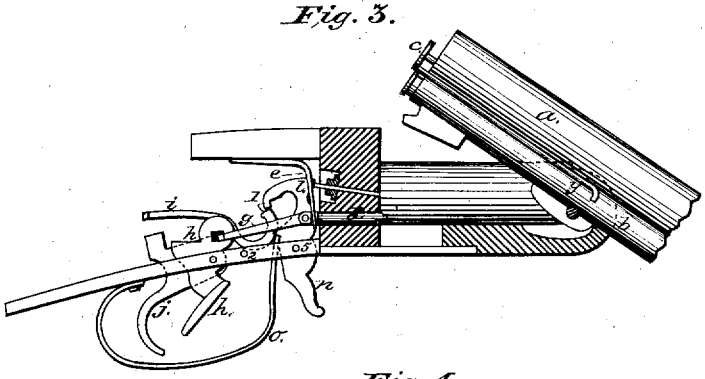
Figure 4:
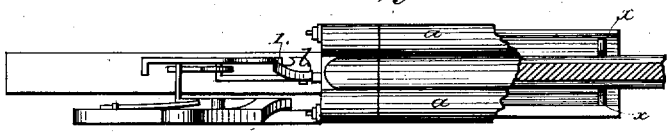

W. H. BAKER.

Breech-Loading Fire-Arms.

No. 8,053. Reissued Jan. 22, 1878.

*Witnesses:*

George J. Gardner.

Peter Burns.

*Inventor:*

Wm H. Baker

UNITED STATES PATENT OFFICE.

WILLIAM H. BAKER, OF SYRACUSE, NEW YORK.

IMPROVEMENT IN BREECH-LOADING FIRE-ARMS.

Specification forming part of Letters Patent No. 167,293, dated August 31, 1875; Reissue No. 8,053, dated January 22, 1878; application filed December 21, 1877.

*To all whom it may concern:*

Be it known that I, WILLIAM H. BAKER, of Syracuse, in the county of Onondaga and State of New York, have invented certain new and useful Improvements in Breech-Loading Fire-Arms; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to breech-loading fire-arms, and particularly to an arm having two shot-barrels arranged side by side and a rifle-barrel beneath and between the two, as shown; and my invention consists in the lock-fast and its connections and the lock for firing the rifle or lower barrel, as will more particularly appear hereinafter.

By my arrangement the joint is readily made for a drop-down gun, the extractor is readily adapted to its position and to be operated, and the three locks are easily adjusted in the space behind the recoil-shield or abutment.

Referring to the drawings, *a a* represent the shot-barrels, and *b* the rifle-barrel secured under and between the two shot-barrels. The lump for coupling the barrels with the break-off is secured to the rifle-barrel, and by a slight deepening of the frame or break-off the rifle-barrel is inclosed, and the gun has all the symmetry of an ordinary double gun carrying a ramrod.

The tilting of the barrels is in the usual manner of a double drop-down gun.

The cartridge-extractor C is made with a plate extending to the cartridge-chambers of all of the barrels; and, instead of a central stem, it has two stems, *y*, which straddle the rifle-barrel, and are operated upon to move the extractor by projections or lumps *x x* on the frame near the joint.

The lock-fast, which is adapted to any kind of break-down gun, consists of a snap-catch or bolt, *d*, operated to project into the notch in the rear lump on the barrels by a spring, *e*. This bolt is withdrawn to unlock the barrels by the trigger *h*, which has a notch or slot, with which a connecting-link, *g*, is coupled. By pushing forward upon the lower end of this trigger the front upper corner is drawn backward, which movement, acting through the link, draws the bolt *d* backward and frees the barrels, so that they may be tilted. Should the spring fail to act, the trigger, upon being pulled to fire the arm, will be forced forward into position.

It will be seen that the sear cannot be tripped to fire any of the barrels before the bolt has been forced forward to lock the barrels in position to be fired.

The lock which I have specially devised for my arrangement of barrels, and for the purpose of firing the rifle-barrel, consists, as shown, of a hammer, *l*, having a notched backwardly-projecting head, with an extension part, *n*, outside of the frame and in front of the trigger-guard. The sear in this case is pivoted at 2, and extends back over the top of the rear trigger *j*, as well as *h*, so that the hammer will be released by either trigger.

The triggers operate the ordinary locks for the upper barrel as well as that for the rifle-barrel.

The extension *n* of the hammer *l* is for cocking purposes, and, in order to retain the usual space for the ordinary side locks, I make the trigger-guard *o* the mainspring for my central lock.

Having thus described my invention, I claim as new—

1. In combination with one of the triggers for operating one of the hammers, a locking-device for holding the barrels in position, substantially as shown.

2. The trigger *h*, having a slot in its upper part, in combination with the connecting-rod *g*, bolt *d*, and barrels, as set forth.

3. The combination of the third hammer *l* with the sear, extending to both triggers, so as to be operated by either one, substantially as described.

4. The combination of the concealed hammer *l*, pivoted to the base-plate, and having an external projection for cocking the same, with the guard *o*, acting as a spring for this hammer, all substantially as set forth.

In testimony that I claim the foregoing I have hereunto set my hand this 15th day of December, 1877.

WM. H. BAKER.

Witnesses:
GEORGE J. GARDNER,
PETER BURNS.